(12) United States Patent
Mottola et al.

(10) Patent No.: US 12,452,543 B2
(45) Date of Patent: Oct. 21, 2025

(54) IMAGING SYSTEM WITH AIMING ASSEMBLY CONFIGURED TO EMIT MULTIPLE LIGHT PATTERNS

(71) Applicant: ZEBRA TECHNOLOGIES CORPORATION, Lincolnshire, IL (US)

(72) Inventors: Michael A. Mottola, Sayville, NY (US); Alexander J. Naney, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 270 days.

(21) Appl. No.: 18/227,797

(22) Filed: Jul. 28, 2023

(65) Prior Publication Data
US 2025/0039555 A1    Jan. 30, 2025

(51) Int. Cl.
*H04N 23/74*    (2023.01)
*G06K 7/14*    (2006.01)
*H04N 23/51*    (2023.01)
*H04N 23/56*    (2023.01)
*H04N 23/90*    (2023.01)

(52) U.S. Cl.
CPC ............. *H04N 23/74* (2023.01); *H04N 23/51* (2023.01); *H04N 23/56* (2023.01); *H04N 23/90* (2023.01); *G06K 7/1413* (2013.01); *G06K 7/1417* (2013.01)

(58) Field of Classification Search
CPC ........ H04N 23/74; H04N 23/51; H04N 23/56; H04N 23/90; G06K 7/1413; G06K 7/1417; G06K 2207/1011; G06K 7/10722; G06K 7/10881; G06K 2007/10524; G06K 7/10801; G02B 27/20; G02B 26/10
See application file for complete search history.

(56) References Cited

U.S. PATENT DOCUMENTS

| | | | |
|---|---|---|---|
| 7,686,223 B2 | 3/2010 | Vinogradov et al. | |
| 8,087,587 B2 | 1/2012 | Vinogradov et al. | |
| 9,800,749 B1 | 10/2017 | Tan et al. | |
| 10,067,355 B1 | 9/2018 | Handshaw et al. | |
| 10,817,687 B2 | 10/2020 | Tan et al. | |
| 10,929,623 B2 | 2/2021 | Wittenberg et al. | |
| 11,256,889 B2 | 2/2022 | Tan et al. | |
| 11,854,333 B2 * | 12/2023 | Van Horn | G07D 7/12 |
| 2009/0057413 A1 | 3/2009 | Vinogradov et al. | |
| 2017/0289421 A1 * | 10/2017 | Tan | H04N 23/74 |
| 2017/0289451 A1 | 10/2017 | Wittenberg et al. | |
| 2017/0343345 A1 * | 11/2017 | Wittenberg | G01C 3/085 |

(Continued)

*Primary Examiner* — Lin Ye
*Assistant Examiner* — Tuan H Le
(74) *Attorney, Agent, or Firm* — Yuri Astvatsaturov

(57) ABSTRACT

An imaging system includes a first imager, a second imager, and an aiming assembly. The aiming assembly is configured to selectively output light having at least one of a first pattern or a second pattern, where the light having the first pattern intersects a first imaging axis of the first imager and the light having the second pattern intersects a second imaging axis of the second imager. The aiming assembly defines a first light pathway that is common to the light for the first pattern and the second pattern and defines second and third light pathways. The light travels from the first light pathway along the second light pathway to selectively output the first pattern and travels from the first light pathway along the third light pathway to selectively output the second pattern.

22 Claims, 10 Drawing Sheets

(56) References Cited

U.S. PATENT DOCUMENTS

2019/0228195 A1* 7/2019 Lozano ................ H04N 23/671
2019/0294838 A1* 9/2019 Drzymala ........... G06K 7/10722
2022/0295038 A1* 9/2022 Venkataraman ..... H04N 13/271

* cited by examiner

IMAGING SYSTEM WITH AIMING ASSEMBLY CONFIGURED TO EMIT MULTIPLE LIGHT PATTERNS

BACKGROUND

Imaging systems that are configured to acquire images of encoded indicia, such as barcodes or other symbologies, can include an aiming subsystem, which generates a visible light pattern within the field-of-view of an imager of the imaging system to facilitate aiming of the imaging systems at a desired target object. Aiming subsystems are typically not coaxially aligned with the imager because the aiming subsystem can interfere with the ability of the imager to capture images. The axial offset between the imager and aiming subsystem can result in a target distance at which the visible light pattern intersects the imaging (center) axis of the field-of-view of the imager, but at other target distances, the visible light pattern can be shifted with respect to the center axis of the field-of-view of the imager.

To improve the working range of imagining systems, some imaging systems have two imagers, one for a near-field and one for a far-field. The use of two imagers complicates the use of the aiming subsystems due to, for example, the ability to switch between the imagers based on the targets being imaged, the different working ranges of the two imagers, and/or the different imaging axes of their respective fields-of-view.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
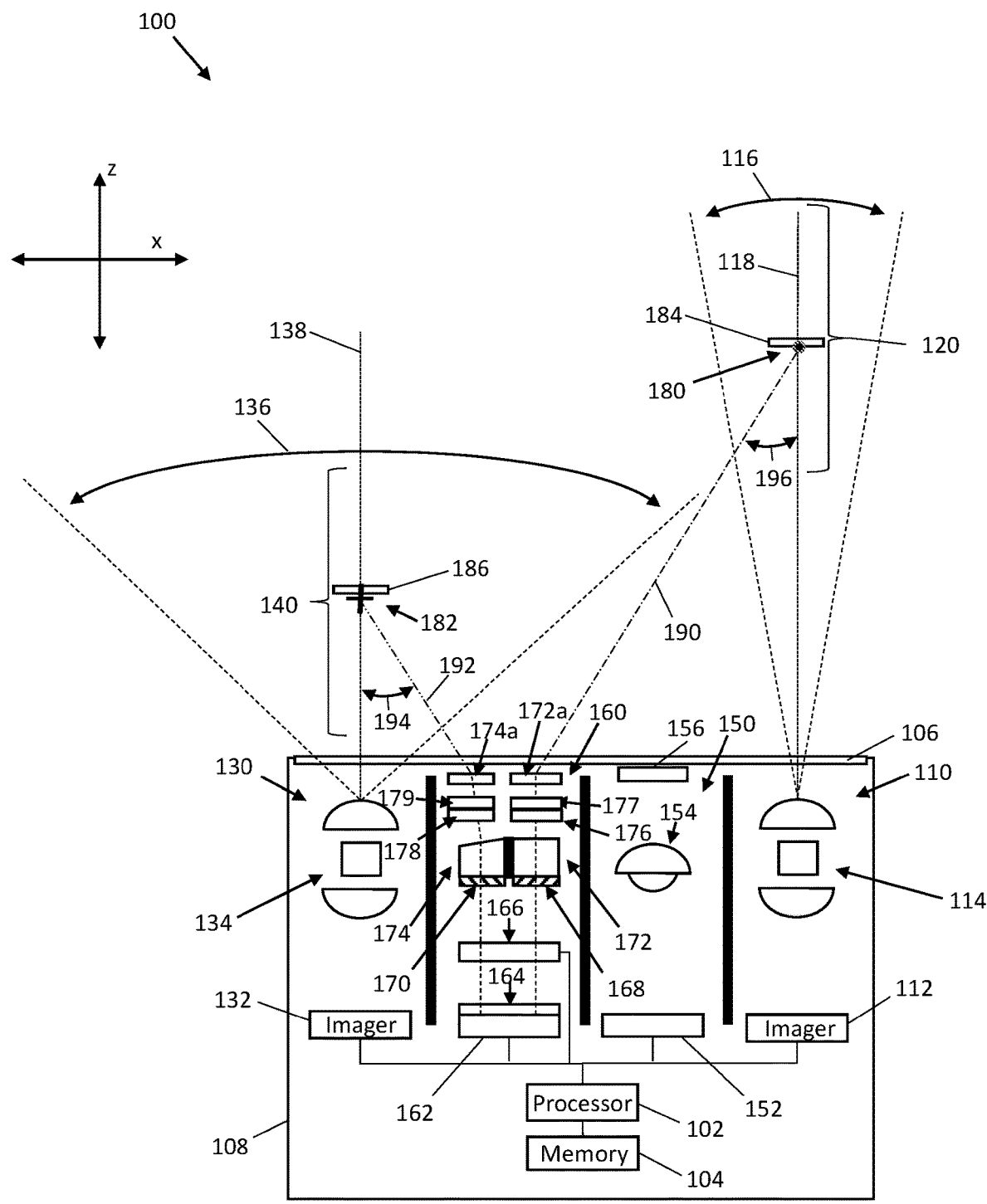
FIG. 1 is a schematic diagram of an example imaging system in accordance with embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The components of embodiments of the present disclosure have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Embodiments of the present disclosure relate to imaging systems including at least two imagers having different imaging axes and different working distance ranges, and including an aiming assembly configured to selectively emit different patterned beams of light into the respective fields-of-view of the imagers to provide visually indicators in the fields-of-view. The patterned beams of light can provide multipurpose information for the operations and/or use of the imaging system. For example, the patterned beams of light can be selectively emitted into the respective fields-of-view to aid in a ranging operation performed by the imaging system to determine which of the imagers should be used by the imaging system to acquire images of a target object and/or to aid in an aiming operation performed by the imaging system to facilitate determining where the fields-of-view of the one or both imagers are being aimed before acquiring images for subsequent processing (e.g., during detect and decode operations performed by the imaging system).

One light source can be utilized to generate the different patterned beams of light for each of the fields-of-view, where the light emitted by the lights travels along a common pathway and then selectively diverges along different divergent pathways based on which of the patterned beams of light are to be output by the aiming system. The divergent pathways are laterally offset from each other to advantageous provide for sufficient spacing of the patterned light beams and components of the aiming assembly utilized to generate the patterned beams of light. Additionally, in some circumstances, the divergent separate and distinct pathways also advantageously allow for both patterned beams of light to be selectively output from the aiming assembly without interfering with each other.

In accordance with embodiments of the present disclosure, an imaging system is disclosed. The imaging system includes a first imager, a second imager, and an aiming assembly. The first imager has a first field-of-view extending along a first imaging axis. The second imager has a second field-of-view extending along a second imaging axis. The second imaging axis is offset from the first imaging axis. The aiming assembly is configured to selectively output light having at least one of a plurality of light patterns. The plurality of light patterns including at least a first pattern and a second pattern. The light having the first pattern intersects the first imaging axis. The light having the second pattern intersects the second imaging axis. The aiming assembly defines a first light pathway that is common to the light for the first pattern and the second pattern and defines second and third light pathways that are separate and distinct from each other. The light travels from the first light pathway along the second light pathway to selectively output the first pattern and the light travels from the first light pathway along the third light pathway to selectively output the second pattern.

In accordance with embodiments of the present disclosure, an imaging system is disclosed. The imaging system includes a first imager, a second imager, a light source, a controllable polarizing device, a first polarizing filter element, a second polarizing filter element, and a pattern generating device. The first imager has a first field-of-view extending along a first imaging axis. The second imager has a second field-of-view extending along a second imaging axis. The second imaging axis being offset from the first imaging axis. The light source that emits light. The controllable polarizing device is configured to polarize the light to have a selected polarization from a plurality polarizations in response to an electrical signal, the select polarization being a first polarization or a second polarization. The first polarizing filter element is configured to allow light to pass through the first polarizing filter element when the light has the first polarization and to block the light from passing through the first polarizing filter element when the light has the second polarization. The second polarizing filter element is configured to allow the light to pass through the second polarizing filter element when the light has the second polarization and to block the light from passing through the second polarizing filter element when the light has the first polarization. The pattern generating device is disposed relative to the second polarizing filter element and generates patterned light when the light from the second polarizing filter element passes through the pattern generating device. The light intersects the first imaging axis when the light passes through the first polarizing filter element and the light intersects the second imaging axis when the light passes through the second polarizing filter element.

In accordance with embodiments of the present disclosure, a method is disclosed. The method includes positioning a first imager in a housing and positioning a second imager in the housing. The first imager has a first field-of-view extending along a first imaging axis. The second imager has a second field-of-view extending along a second imaging axis. The second imaging axis is offset from the first imaging axis. The method also includes positioning an aiming assembly in the housing. The aiming assembly is configured to selectively output light having at least one of a plurality of light patterns, the plurality of light patterns including at least a first pattern and a second pattern. The light having the first pattern is configured to intersect the first imaging axis and the light having the second pattern is configured to intersect the second imaging axis. The method further includes forming a first light pathway with the aiming assembly. The first light pathway is configured to be common to the light for the first pattern and the second pattern. The method also includes forming second and third light pathways that are separate and distinct from each other. The light is configured to travel from the first light pathway along the second light pathway to selectively output the first pattern and is configured to travel from the first light pathway along the third light pathway to selectively output the second pattern.

In accordance with embodiments of the present disclosure, a method is disclosed. The method includes emitting, via a light source, light along a first light pathway; polarizing, via a controllable polarizing device, the light to generate polarized light having a selected polarization from a plurality of polarizations, the selected polarization being at least one of a first polarization or a second polarization; and irradiating a first polarizing filter element and a second polarizing filter element with the polarized light. The first polarizing filter element is configured to allow polarized light to pass through when the polarized light has the first polarization and to block polarized light from passing through when the polarized light has the second polarization. The second polarizing filter element is configured to allow polarized light to pass through when the polarized light has the second polarization and to block polarized light from passing through when the polarized light has the first polarization. The method also includes passing the polarized light through one of (i) the first polarization filter element and along a second light pathway or (ii) the second polarizing filter element and along a third light pathway based on whether the polarized light has the first polarization or the second polarization. The method further includes outputting the polarized light with at least one of a first pattern via the second light pathway or a second pattern via the third light pathway. The polarized light output with the first pattern intersects a first imaging axis of a first imager and the polarized light output with the second pattern intersects a second imaging axis of a second imager. The second imaging axis being offset from the first imaging axis.

In accordance with embodiments of the present disclosure, the first light pathway of the aiming assembly includes a light source and/or a controllable polarizing device positioned therein. The light source can be configured to emit light along the first light pathway. The controllable polarizing device is disposed along the first light pathway and can polarize the light to have a first polarization or a second polarization in response to an electrical signal.

In accordance with embodiments of the present disclosure, the aiming assembly can include a first polarizing filter element and/or a second polarizing filter element positioned therein. The first polarizing filter element can be configured to allow the light having the first polarization to pass through. The second polarizing filter element can be configured to allow the light having the second polarization to pass through. The first polarizing filter element can define a first transition from the first light pathway to the second light pathway and the second polarizing filter element can define a second transition from the first light pathway to the third light pathway. The second light pathway can include the first polarizing filter element and/or a refractive prism positioned therein. The third light pathway can include the second polarizing filter element, a refractive prism, and/or a pattern generating element positioned therein. An output surface of the refractive prism is disposed at an angle relative to an orthogonal plane that is orthogonal to a direction the light travels through the first light pathway. The light output from the aiming assembly with the first pattern and the light output from the aiming assembly with the second pattern diverge from each other.

In accordance with embodiments of the present disclosure, the first light pathway can have a first axis and the first light pathway splits into the second and third light pathways. The second light pathway can have a second axis and the third light pathway can have a third axis. The second and third axes can be offset from each other and from the first center axis. The second axis can be offset to a first side of the first axis and the third axis can be offset to a second side of the first axis. The second side can be opposite the first side.

FIG. 1 illustrates a schematic block diagram of an imaging system 100 in accordance with embodiments of the present disclosure. It should be understood that FIG. 1 is not drawn to scale. The imaging system 100 includes a processor 102, memory 104, a window 106, a housing 108, a first imaging assembly 110, a second imaging assembly 130, an illumination assembly 150, and/or an aiming light assembly 160. The housing 108 can contain the processor 102, the memory 104, the window 106, the first imaging assembly 110, the second imaging assembly 130, the illumination assembly 150, and/or the aiming light assembly 160. The window 106 provides a light transmissible material that allows light into and out of the housing 108.

Figure 2A:
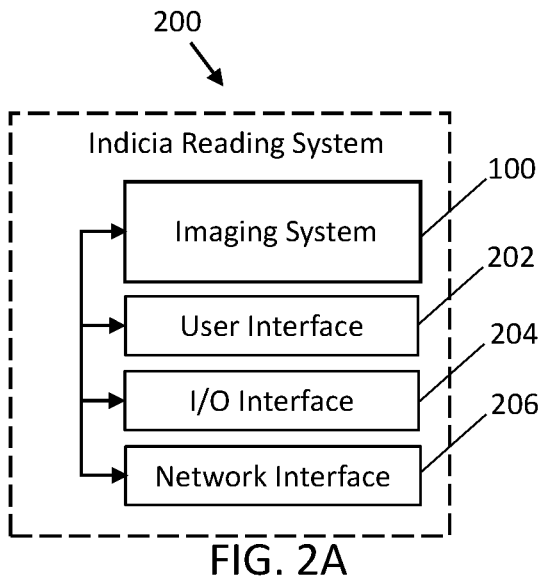
FIG. 2A is a block diagram illustrating an example indicia reading system in accordance with embodiments of the present disclosure.
Figure 2B:
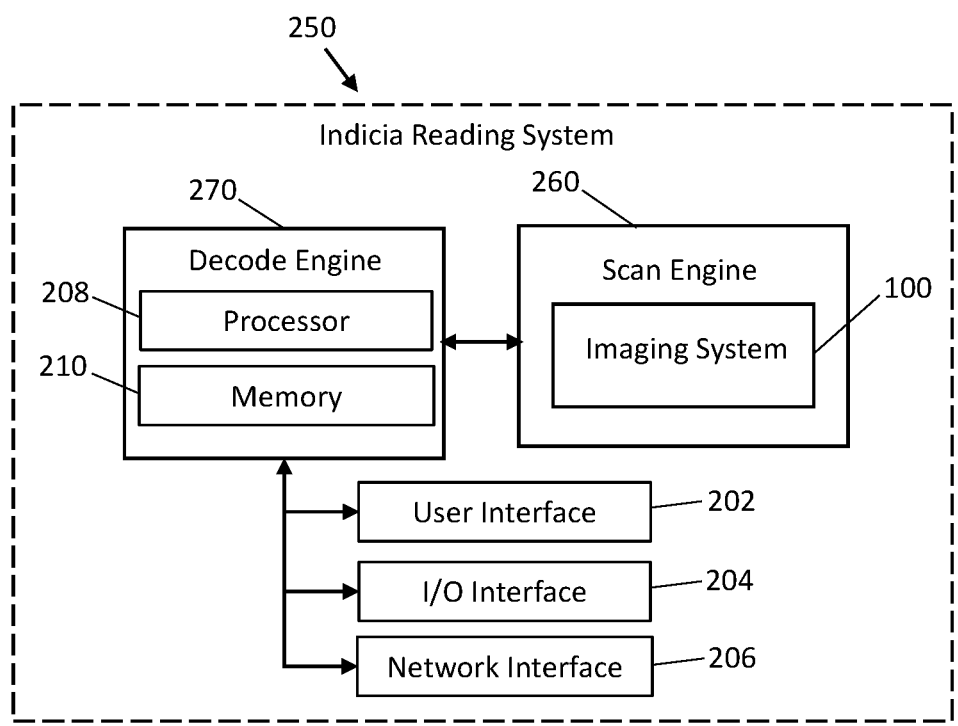
FIG. 2B is a block diagram illustrating another example indicia reading system in accordance with embodiments of the present disclosure.

The imaging system 100 can be embodied as an indicia reading system or a portion of an indicia reading system, where the indicia reading system is configured to acquire images of encoded indicia that can be detected and decoded to extract information from the encoded indicia. The encoded indicia can be any set of glyphs that are encode information or data according to, for example, a defined symbology, mapping, or encoding/decoding scheme. Non-limiting examples of encoded indicia can include, for example, linear or 1D barcodes, matrix codes or 2D barcodes, a combination of 1D and 2D barcodes (or stacked barcode), and/or any other symbologies. The indicia reading system can have a variety of configurations including self-contained or integrated configurations in which an operation and function of the indicia reading system is performed by a single apparatus, module, or device and distributed configurations in which the operation and function of the imaging system 100 is controlled and/or performed in a distributed manner across multiple apparatuses, modules, or devices. As a non-limiting example, as shown in FIG. 2A, the imaging system 100 can be embodied as an indicia reading system 200 that is configured to acquire images, detect encoded indicia in the images, decode the encoded indicia, and output information extracted based on decoding the encoded indicia via a user interface 202, an I/O interface 204, and/or a network interface 206. As another non-limiting example, as shown in FIG. 2B, the imaging system 100 can be embodied as a scan engine or module 260 of an indicia reading system 250 that is configured to acquire images that include encoded indicia and the scan engine 260 can communicate with a decode engine or module 270 of the indicia reading system 250 which detects and decodes the encoded indicia in the image acquired by the scan engine 260. The decode engine 270 can include a processor 208 and memory 210. The processor 208 can execute code stored in the memory 210 to process and/or analyze images received from the scan engine 260 to detect and decode the encoded indicia, and can output the information extracted based on decoding the encoded indicia via the user interface 202, the I/O interface 204, and/or the network interface 206 of the indicia reading system.

Referring to FIGS. 1, 2A, and 2B, the imaging system 100, the indicia reading system 200, the indicia reading system 250, and/or portions thereof can be embodied in various form factors including, but not limited to, handheld or mobile form factors with or without a base or dock, wearable form factors, fixed or stationary form factors, semi-stationary form factors, and/or any other suitable form factors. Some examples of the imaging system 100 embodied as an indicia reading system or portions thereof (e.g., indicia reading system 200 and/or 250) can include, but are not limited to, a handheld "gun" style indicia reader that can be held and aimed by a user and/or can rest upon a surface or on a base or dock to be semi-stationary, a mobile indicia reader having a variety of shapes that can be held and aimed by a user and/or can rest upon a surface or on a base or dock to be semi-stationary, a generally fixed or stationary vertical slot scanner having a generally upright window with a fixed field-of-view, a generally fixed or stationary horizontal slot scanner having a generally horizontal window with a fixed field-of-view, a fixed or stationary bioptical workstation having both a generally horizontal window and a generally upright window with fixed fields of view, and/or any suitable form factors and configurations.

The first imaging assembly 110 includes a first imager 112 and a first lens assembly 114. The first imager 112 can include an array of photosensitive cells or pixels defining an image frame. Some examples of the first imager 112 can include a charge coupled device (CCD), a complementary metal-oxide semiconductor (CMOS) imager, and/or another type of image sensor. Common components associated with reading out and processing the charge collected by the first imager 112, including for example, shift registers, amplifiers, timing/clock generators, analog-to-digital converters, digital-to-analog converters, and/or other components can also be denoted by the imager 112. The first imager 112 captures images of an environment through the window 106 and/or first lens assembly 114, where formation of an image on the photosensitive cells of the first imager 112 in the image fame corresponds to photons or light scattered from and/or emitted by objects in the environment that impinge upon the photosensitive cells through the window 106 and/or the first lens assembly 114. The images captured by the first imager 112 correspond to an imaging field-of-view (FOV) 116 of the first imager 112, which can have an imaging (center) axis 118 (extending along the z-axis in the orientation illustrated in FIG. 1). The first imager 112 and imaging lens assembly 114 can be paired to operate together to capture images over the field-of-view (FOV) 116 within a working range distance. For example, the first imaging assembly 110 is configured to acquire images over a working distance range referred to as a far imaging working distance range 120, e.g., which can be approximately 24 inches from the window 106 to approximately 700 inches from the window 106. The first imager 112 can be controlled by the processor to continuously capture images, capture a burst, batch, or series of images in response to an activation event, and/or capture a single image in response to an activation event. The first lens assembly 114 can include fixed optics to have a fixed focal distance or can include adjustable optics to have a variable focal distance.

The second imaging assembly 130 includes a second imager 132 and a second lens assembly 134. The second imager 132 can include an array of photosensitive cells or pixels defining an image frame. Some examples of the second imager 132 can include a charge coupled device (CCD), a complementary metal-oxide semiconductor (CMOS) imager, and/or another type of image sensor. Common components associated with reading out and processing the charge collected by the second imager 132, including for example, shift registers, amplifiers, timing/clock generators, analog-to-digital converters, digital-to-analog converters, and/or other components can also be denoted by the imager 132. The second imager 132 captures images of an environment through the window 106 and/or second lens assembly 134, where formation of an image on the photosensitive cells of the second imager 132 in the image fame corresponds to photons or light scattered from and/or emitted by objects in the environment that impinge upon the photosensitive cells through the window 106 and/or the second lens assembly 134. The images captured by the second imager 132 correspond to an imaging field-of-view (FOV) 136 of the second imager 132, which can have an imaging axis 138 (extending along the z-axis in the orientation illustrated in FIG. 1). The second imager 132 and second imaging lens assembly 134 are paired to operate together to the images over the field-of-view (FOV) 136 within a working range distance. For example, the second imaging assembly 130 is configured to acquire images over a working distance range referred to as a near-field working distance range 140, which, as a non-limiting example, can be approximately 0 inches from the window 106 to approximately 36 inches from the window 106. The field-of-view (FOV) 136 can be narrower than, wider than, or have the same width as the FOV 116. The second imager 132 can be controlled by the processor to continuously capture images, capture a burst, batch, or series of images in response to an activation event, and/or capture a single image in response to an activation event. The second lens assembly 134 can include fixed optics to have a fixed focal distance or can include adjustable optics to have a variable focal distance. A distance between the first imager 112 and the first lens assembly 114 can be different from a distance between the second imager 132 and the second lens assembly 134.

The illumination assembly 150 includes an illumination source 152, an illumination lens 154, and a window 156 that includes multiple sections designed to propagate light in different ways. The illumination assembly 150 can emit diffuse and/or direct light over an illumination field, which may or may not encompass FOVs 116 and 136. The light emitted by the illumination source 152 can be emitted at one or more wavelengths and/or intensities in the light spectrum, including, for example, the visible light spectrum, the infrared light spectrum, and/or the ultraviolet light spectrum. The wavelengths and/or intensities of the light emitted by the illumination source 152 can be controllable via the processor 180 such that the illumination source 152 can emit light at specified wavelengths and/or intensities. The illumination source 152 can be a continuous light source, an intermittent light source, or a signal-controlled light source, such as a light source triggered by user interface, an event, an action, and the like. As a non-limiting example, the illumination source 152 can be light emitting diodes (LEDs) that can be controlled in response to control signals from the processor 102. In an example application, the illumination source 152 can emit light to illuminate a portion of the environment in the FOVs 116 and 136 of the imagers 112 and 132, respectively, before and/or during acquisition of images from which encoded indicia are to be decoded. The illumination lens 154 and window 156 can include optics for dispersing, focusing, spreading, and/or filtering the light emitted from the illumination source 152. The illumination assembly 150 can be positioned between the first imaging assembly 110 and the second imaging assembly 130 relative to the x-axis in the orientation illustrated in FIG. 1.

The aiming assembly 160 includes an aiming light source 162, a collimator 164, a controllable polarization device 166, a first polarizing filter 168, a second polarizing filter 170, refractive elements, such as refractive prisms 172 and/or 172a, refractive elements, such as refractive prisms 174 and/or 174a, a color filter 176, a pattern generating element 177, a color filter 178, and/or a pattern generating element 179. While an example embodiment of the aiming assembly 160 is illustrated with certain components, exemplary embodiments of the aiming assembly 160 can include more or fewer components and/or one or more of the components can be combined. As an example, embodiments of the aiming assembly 160 can be devoid of any, one or more, or any combination of the refractive prism 172, the refractive prism 174, the refractive prism 172a, the refractive prism 174a, the color filter 176, the pattern generating element 177, the color filter 178, and/or the pattern generating element 179. As another example, the aiming system 160 can be devoid of the pattern generating element 177 as well as the color filters 176 and/or 178. As another example, the pattern generating element 177 and the color filter 176 can be combined and/or the pattern generating element 179 and the color filter 178 can be combined.

The aiming assembly 160 can be positioned between the first imaging assembly 110 and the second imaging assembly 130 relative to the x-axis in the orientation illustrated in FIG. 1. The aiming assembly 160 can be controlled by the processor 102 to emit patterned beams of light 190 and 192 that are directed to the field-of-views 116 and 136 of the imaging assemblies 110 and 130, respectively, to provide a visual indication indicating at what in an environment the imager 112 and/or imager 132 are aimed towards and/or can be used to determine a distance of an object in the FOV 116 or 136 from the window 106, which can be used by the processor 102 to select the imager 112 or the imager 132 should be used to acquire images for decoding encoded indicia. The aiming assembly 160 can define a first light pathway that extends from the aiming light source 162 through the collimator 164 and the controllable polarization device 166 up to the polarizing filters 168 and 170, at which point the aiming assembly define two distinct, lateral offset (along the x-axis) light pathways (second and third light pathways). The second light pathway can extend from the polarizing filter 168 through the refractive prism 172, the pattern generating element 177, the color filter 176, and/or the refractive prism 172a. The third light pathway can extend from the polarizing filter 170 through the refractive prism 174, the pattern generating element 179, the color filter 178, and/or the refractive prism 174a. The aiming light source 162 can be active or energized during image acquisition for a ranging operation in which the location of the patterned beams of light 190 and 192 in the field-of-view 116 or 136 of the imager 112 or 132, respectively, can be used to determine a distance of an object in the field-of-view 116 or 136 from the window and/or can be activated or energized during imaging acquisition for an aiming operation to aid in aiming the imaging system 100 towards encoded indicia in the environment and/or acquiring images including the patterned beams of light. The aiming light source can deactivated or deenergized when acquiring images of a scene in which the patterned beams of light from the aiming assembly 160 can be distracting and/or can cause issues in processing the images. As an example, once the user is satisfied that the imaging system 100 is being aimed at a target encoded indicia in the environment based on observance of the patterned beams of light from output by the aiming assembly 160, the user can activate (e.g., via a user interface component, such as a trigger or button) acquisition of one or more image frames in a detect and decode operation with the aiming light source 162 deactivated or deenergized. The aiming light source 162 is deactivated when images are acquired for detection and decoding of encoded indicia because the patterned beams of light output by the aiming light assembly can prevent the detection and/or decoding of encoded indicia captured in the images.

The patterned beams of light 190 and 192 emitted by the aiming assembly 160 are directed to the field-of-views 116 and 136 of the imaging assemblies 110 and 130 by the refractive elements (e.g., refractive prisms 172, 172a, 174, and/or 174a) to intersect the imaging axes 118 and 138 at specified distances from the window 106. As an example, the aiming assembly 160 can emit the patterned beam of light 190 having a first pattern 180 (illustrated as a dot or circle in FIG. 1) that is directed to intersect the imaging axis 118 (e.g., along the z-axis) in the far-field working range distance 120 (e.g., at a mid-point or other point the far-field working range distance) and can emit the patterned beam of light 192 having a second pattern 182 (illustrated as a cross (+) in FIG. 1) that is directed to intersect the imaging axis 138 (e.g., along the z-axis) in the near-field working range distance 140 (e.g., at a mid-point or other point of the near-field working range distance). While dot and cross patterns have been illustrated for the first and second patterns 180 and 182, respectively, the first and second patterns can be implemented using different patterns.

Advantageously, the aiming pattern assembly 160 separately generates the patterned beams of light 190 and 192 for the imagers 112 and 132, respectively, to aid aiming the imaging system 100 at a target encoded indicia based on the selected imager to be used by the imaging system 100 to acquire images of encoded indicia to be decoded. Using different patterned beams of light for the first and second patterns 180 and 182, respectively, can allow a user, the processor 102, and/or another device to visually determine which of the imagers 112 and/or 132 are acquiring images and/or which of the fields-of-view 116 and/or 132 encoded indicia to be imaged is in. For example, when a target object 184 is disposed at the point where the patterned beam of light 190 having the first pattern 180 intersects the imaging axis 118, the first pattern 180 can irradiate the target object 184 such that the first pattern 180 is visible to a user of the imaging system 100 on the target object 184 in a ranging operation and/or an aiming operation. When a target object 186 is disposed at the point where the patterned beam of light 192 having the second pattern 182 intersects the imaging axis 138, the second pattern 182 can irradiate the target object 186 such that the second pattern 182 is visible to a user of the imaging system 100 on the target object 186 and/or can be captured in an image acquired by the imager 132. When the first pattern 180 is visible on the target object 184 or the second pattern 182 is visible on the target object 186 it can indicate that the imaging system 100 is properly aimed at the target object 184 or 186 such that the image 112 or 132, respectively can acquire images that include encoded indicia on the target object 184 or 186.

In exemplary embodiments, the aiming assembly 160 can be positioned closer to the second imaging assembly 130 than the first imaging assembly 110 along the x-axis to reduce the offset of the aiming assembly 160 from the imaging axis 138 of the second imaging assembly 130. In this configuration, a divergence angle 194 between the patterned beam of light 192 having the second pattern 182 and the imaging axis 138 can be reduced; thereby reducing an effect of the parallax within the near-imaging working distance range 140 of the field-of-view 136. Positioning the aiming assembly 160 closer to the second imaging assembly 130 than the first imaging assembly 110 will cause a divergence angle 196 between the patterned beam of light 190 having the first pattern 180 and the imaging axis 118 of the first imaging assembly 110 to be larger than if the aiming assembly 160 was at a midpoint between the first and second imaging assemblies 110 and 130 along the x-axis or closer to the first imaging assembly 110. However, because the far-imaging working distance range 120 of the first imaging assembly 110 is a further distance from the window 106 than the near-imaging working distance range 140, the impact of positioning the aiming assembly 160 closer to the second imaging assembly 130 on the divergence angle 196 between the patterned beam of light 190 having the first pattern 180 and the imaging axis 118 of the first imaging assembly 110 is mitigated.

The aiming light source 162 is a source of visible light (e.g., light in a wavelength range of approximately 400 nanometers to 750 nanometers). The light emitted by the aiming light source 162 can be polarized or unpolarized light. As an example, the aiming light source 162 can be a laser diode that generates a beam of coherent visible light which is a circular or elliptical in cross section or can be a light emitting diode (LED) that emits light within the visible spectrum. The processor 102 can control the aiming light source 162 to emit light during a ranging operation and an aiming operation of the imaging system 100. The collimator 164 can receive the light emitted by the aiming light source 162 and can output a collimated beam of light having substantially parallel rays with a specified divergence.

The collimated beam of light can be received by the controllable polarization device 166, which can be controlled in response to an electrical signal from the processor 102 to polarize the collimated beam of light with a selected polarization. Examples of the controllable polarization device 166 can include one or more or a combination of an electro-optical polarizer, electro-mechanical polarizer, a mechanical polarizer, an electro-optical waveplate, a polarization controller, and/or other controllable polarization devices that are configured to polarize light with different polarizations where the polarization device can be controlled to select which polarization to use. For embodiments in which the aiming light source 162 is a variable laser diode and the controllable polarization device 166 is an electrical waveplate, the aiming assembly 160 can realize an increase in an efficiency of the light from the aiming light source 162 to the patterned beams of light by converting a majority of the light to a desired polarization for the selected pathway. For embodiments in which the light emitted by the aiming light beam is unpolarized, the controllable polarization device 166 can polarize the light to a selected polarization. For embodiments in which the light emitted by the aiming light source 162 is polarized, the controllable polarization device 166 can selectively change the polarization of the polarized light to a specified polarization.

The controllable polarization device 166 can output the beam of light with the specified polarization towards the first and second polarizing filters 168 and 170. The polarizing filters 168 and 178 can be fixed, passive polarization filters. The first polarization 168 filter can be configured to permit light having a first polarization through while blocking any light with a polarization that is different from the first polarization. The second polarization 170 filter can be configured to permit light having a second polarization through while blocking any light with a polarization that is different from the second polarization. The polarization filters 168 and 170 can be laterally offset from each, e.g., along the x-axis, and/or can be positioned in a side-by-side relationship. In some embodiments, the first and second polarization filters 168 and 170 can be separate and distinct elements or can be an integrally formed element where a first portion (e.g., one half) of the element can form the first polarization filter 168 and a second portion (e.g., the other half) of the element can form the second polarization filter 170.

The refractive prism 172 can be aligned along the x-axis with the first polarization filter 168 and can be offset from the first polarization filter 168 along the z-axis. The refractive prism 174 can be aligned along the x-axis with the second polarization filter 170 and can be offset from the second polarization filter 170 along the z-axis. In exemplary embodiments, the refractive prisms 172 and 174 can be separate and distinct elements or can be an integrally formed element where a first portion (e.g., one half) of the element can form the refractive prism 172 and a second portion (e.g., the other half) of the element can form the refractive prism 174. The refractive prisms 172 and/or 174 can be configured and dimensioned to direct the light in specified directions within the aiming light assembly, to for example, provide sufficient spacing between the light pathways that lead to respective ones of the pattern generating elements 177 and/or 179 or simply allow the collimated beams of light to pass through the window 106 towards the respective fields-of-view for embodiments that are devoid of the pattern generating element 177 and/or 179.

As an example, polarized beam of light that passes through the first polarization filter 168 (i.e., light having the first polarization) can pass through the first refractive prism 172 and/or can be pass through the pattern generating element 177 and towards the imaging axis 118 to intersect the image axis 118 at a specified distance from the window 106 with a beam of light having the first pattern. A polarized beam of light that passes through the second polarization filter 170 (i.e., light having the second polarization) can pass through the second refractive prism 174 and/or can be pass through the pattern generating element 179 and towards the imaging axis 138 to intersect the image axis 138 at a specified distance from the window 106 with a beam of light having the second pattern. The pattern generating elements 177 and 179 can be, for example, diffractive optical elements (DOEs), refractive optical elements (ROEs), and/or any other optical elements that can generate patterned beams of light. For embodiments in which the aiming light source 162 (e.g., the aiming light source is an LED) emits light having multiple wavelengths in the visible light spectrum (e.g., light in a wavelength range of approximately 400 nanometers to 750 nanometers or a subset of the range), the color filters 176 and 178 can be included to select which wavelengths of light (and therefore the color of light) is output by the aiming assembly 160. For example, the color filter 176 can allow wavelengths in the range of approximately 600 nanometers to approximate 750 nanometers, or a subset of that range, to pass while attenuating light having wavelengths outside of the range, which can result in the patterned beams of light output by the aiming assembly to be red. As another example, the color filter 178 can allow wavelengths in the range of approximately 520 nanometers to approximate 565 nanometers, or a subset of that range, to pass while attenuating light having wavelengths outside of the range, which can result in the patterned beams of light output via aiming assembly to be green.

The processor 102 is communicatively coupled to the first imager 112, the second imager 132, the illumination source 152, the aiming light source 162, the polarization device 166, and the memory 104. The processor 102 include, for example, a microprocessor, a central processing unit (CPU), a graphics processing unit (GPU), a microcontroller, a controller, a field programmable gate array (FPGA), an application specific integrated circuits (ASIC), and/or any suitable type of logic circuits. The processor 102 can have a single core or multiple cores and can implement serial and/or parallel processing. The processor 102 can control an operation of the first imager 112, the second imager 132, the illumination source 129, the aiming light source, and the memory. The processor 102 control the imagers 112 and 132 to capture images of the portion of the environment within the FOVs 116 and 136. The processor 102 can use the acquired images to detect and/or decode encoded indicia (e.g., barcodes) present in the images. One or more image processing and/or object recognition techniques and/or algorithms can be employed by the processor 102 to detect and decode the encoded indicia.

The imaging system 100 includes any number or types of non-transitory computer- or machine-readable storage devices or memory (e.g., volatile memory, non-volatile memory, etc.) 104 accessible by the processor 102. The processor 102 interacts with the memory 104 to obtain, for example, computer- or machine-readable instructions or code stored in the memory. The processor 102 can execute the computer- or machine-readable instructions or code to implement, for example, embodiments of the present disclosure via one or more operations, processes, routines, and/or functions. Additionally or alternatively, computer- or machine-readable instructions corresponding to the example operations described herein may be stored on one or more removable storage devices (e.g., a magnetic storage drive, an optical storage drive, solid state drive, a compact disc (CD), a digital versatile disk (DVD), a removable flash memory, etc.) that may be operatively coupled to the processor 102 to provide access to the computer- or machine-readable instructions stored thereon. The memory 104 can also store images acquired by the imagers 112 and 132; image data associated with the images acquired by the imagers 112 and 132; encoded information from the indicia captured in the images; decoded information from the decoded indicia captured in the images; and/or any other information or data.

Figure 3A:
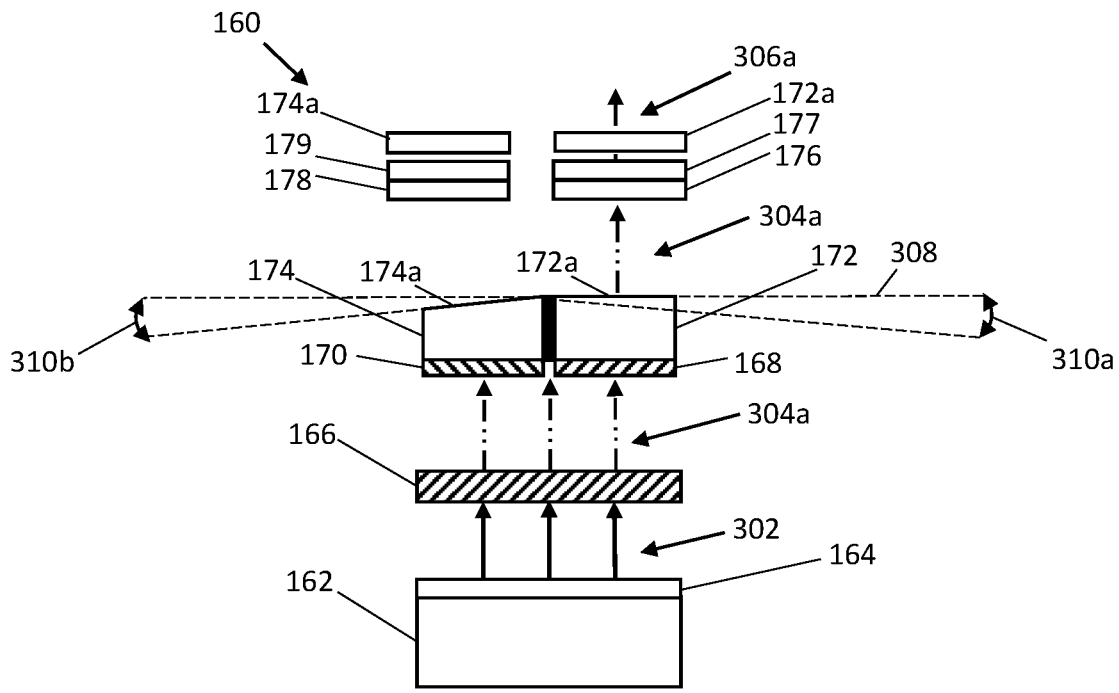
FIG. 3A is a schematic diagram of an example aiming assembly configured to emit a first pattern of light in accordance with embodiments of the present disclosure.
Figure 3B:
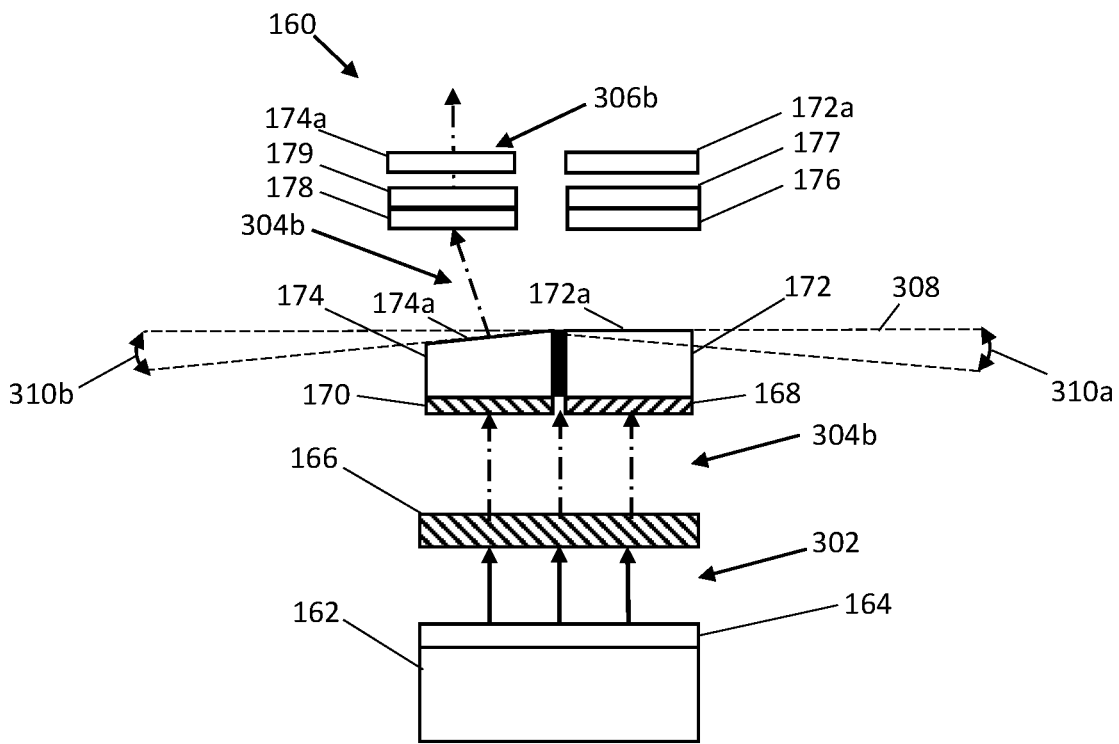
FIG. 3B is a schematic diagram of an example aiming assembly configured to emit a second pattern of light in accordance with embodiments of the present disclosure.
Figure 3C:
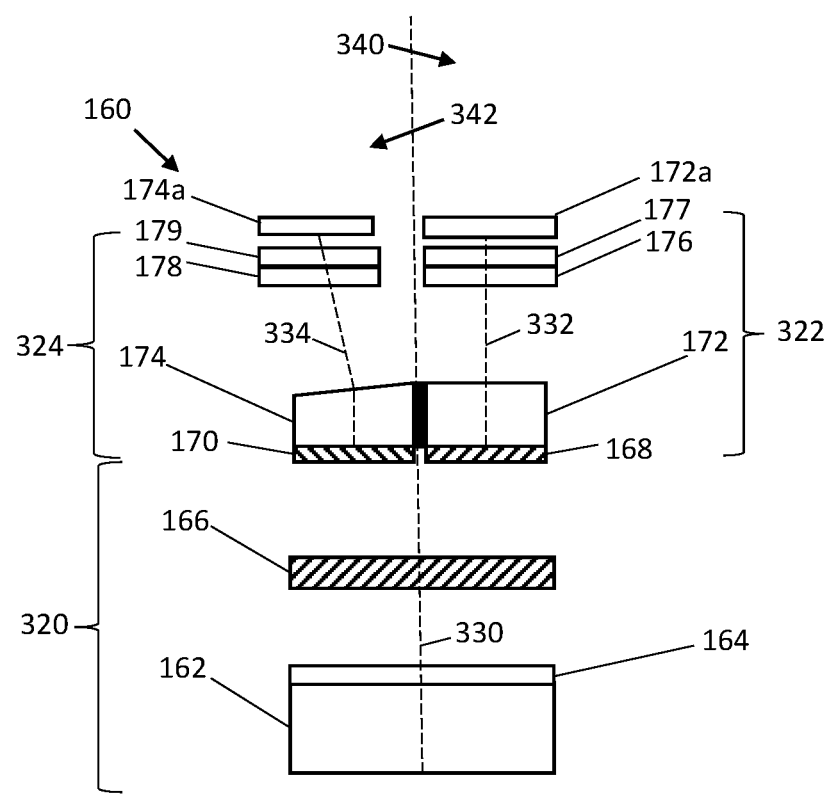

FIGS. 3A-B illustrate an example operation of an embodiment of the aiming assembly 160 of the imaging system 100. As shown in FIGS. 3A and C, the aiming light source 162 emits light along a first light pathway 320 through the collimator 164 to form collimated beams of light 302. The collimated beams of light 302 can travel along the first light pathway 320 and pass through the controllable polarization device 166. In the present example, the controllable polarization 166 is controlled by an electric signal from the processor 102 to polarize the collimated beams of light 302 to have a first selected polarization such that the controllable polarization 166 outputs polarized beams of light 304a having the first polarization along the first light pathway 320. The beams of light 304a can impinge upon the polarization filters 168 and 170. The polarization filter 168 can be configured to allow beams of light having the first polarization to pass through the polarization filter 168 and can block or attenuate light having different polarizations than the first polarization. The polarization filter 170 can be configured to allow beams of light having a second polarization to pass through the polarization filter 170 and can block or attenuate light having different polarizations than the second polarization. The polarization filters 168 and 170 can be used to select between the second light pathway 322 and the third light pathway 324, which are separate and distinct pathways that laterally offset from each other along the x-axis. As an example, the first light pathway 320 has a first center axis 330 and the first light pathway 320 splits into the second light pathway 322 and the third light pathway 324, where the second light pathway 322 has a second center axis 332 and the third light pathway has a third center axis 334. The second center axis 332 of the second light pathway 322 is laterally offset along the x-axis from the third center axis 334 of the third light pathway 324. The second and third center axes 332 and 334 of the first and second light pathway 322 and 324, respectively, are both laterally offset from the center axis 330 of the first light pathway 320 along the x-axis. The second axis 332 is laterally offset along the x-axis to a first side 340 of the first axis 330 and the third axis 334 is on a second opposite side 342 of the first axis 330.

Since the beams of light 304*a* have the first polarization, the beams of light 304*a* pass through the polarization filter 168 and are blocked or attenuated by the polarization filter 170. After the beams of light 304*a* pass through the polarization filter 168, the beams of light 304*a* can travel along the second center axis 332 of the second light pathway 322 and pass through the refractive prism 172, the pattern generating element 177, and/or the color filter 176. In example embodiments, the aiming assembly can be devoid of the refractive prism 172, the pattern generating element 177, and/or the color filter 176. For embodiments that include the refractive prism 172, the input and output surfaces of the refractive prism 172 can disposed orthogonally relative to the direction the beams of light 304*a* are travelling. For example, the output 172*a* of the refractive prism 172 can be parallel to an orthogonal plane 308, which is disposed orthogonally relative to the direction the beams of light 304*a* are travelling. Alternatively, the output surface 172*a* of the refractive prism can be disposed at an angle 310*a* that is neither orthogonal or parallel to the beams of light 304*a* or the orthogonal plane 308 to change a direction in which the beams of light 304*a* are travelling. As a non-limiting example, the angle 310*a* of the output surface 172*a* can be approximate five degrees relative to the orthogonal plane 308, although the output surface can have other angles, for example, between approximately one degree and thirty-five degrees. For embodiments that do not include the pattern generating element 177 and/or the color filter 176, the beams of light 304*a* can have a default pattern, e.g., circular or elliptical formed by the aiming light source 162. For embodiments that include the pattern generating element 177, the pattern generating element 177 can receive the beams of light 304*a* is an input and can output patterned beams of light 306*a*, which can be circular, elliptical, cross hairs, rectangles, and/or any other pattern of light.

As shown in FIGS. 3B and C, the aiming light source 162 emits light along the first center axis 330 of the first light pathway 320 through the collimator 164 to form collimated beams of light 302. The collimated beams of light 302 can travel along the first light pathway 320 and pass through the controllable polarization device 166. In the present example, the controllable polarization 166 is controlled by an electric signal from the processor 102 to polarize the collimated beams of light 302 to have a second selected polarization such that the controllable polarization 166 outputs polarized beams of light 304*b* having the second polarization along the first light pathway 320. The beams of light 304*b* can impinge upon the polarization filters 168 and 170. The polarization filter 168 can be configured to allow beams of light having the first polarization to pass through the polarization filter 168 and can block or attenuate light having different polarizations than the first polarization. The polarization filter 170 can be configured to allow beams of light having the second polarization to pass through the polarization filter 170 and can block or attenuate light having different polarizations than the second polarization. The polarization filters 168 and 170 can be used to select between the second and third light pathways 322 and 324. Since the beams of light 304*b* have the second polarization, the beams of light 304*b* are blocked by the polarization filter 168 and pass through the polarization filter 170. After the beams of light 304*b* pass through the polarization filter 168, the beams of light 304*b* can travel along the center axis 334 of the third light pathway 324 and pass through the refractive prism 174 and/or the pattern generating element 179. In example embodiments, the aiming assembly 160 can be devoid of the refractive prism 174, the pattern generating element 179, and/or the color filter 178. For embodiments that include the refractive prism 177, an output surface of the refractive prism can be disposed at an angle 310*b* relative to the orthogonally plane 308 to change a direction in which the beams of light 304*b* are travelling, while an input surface of the refractive prism can be parallel to the orthogonal plane 308. As a non-limiting example, the angle 310*b* of the output surface 174*a* can be approximate five degrees relative to the orthogonal plane 308, although the output surface can have other angles, for example, between approximately one degree and thirty-five degrees. Alternatively, an output surface 174*a* of the refractive prism 174 can be disposed parallel to the orthogonal plane and orthogonally to the beams of light 304*b* such that the angle 310*b* is approximately zero. For embodiments that include the pattern generating element 179, the pattern generating element 179 can receive the beams of light 304*b* is an input and can output patterned beams of light 306*b*, which be circular, elliptical, cross hairs, rectangles, and/or any other pattern of light. For embodiments that do not include the pattern generating element 179, the beams of light 304*b* can have a default pattern, e.g., circular or elliptical formed by the aiming light source 162.

Figure 4A:
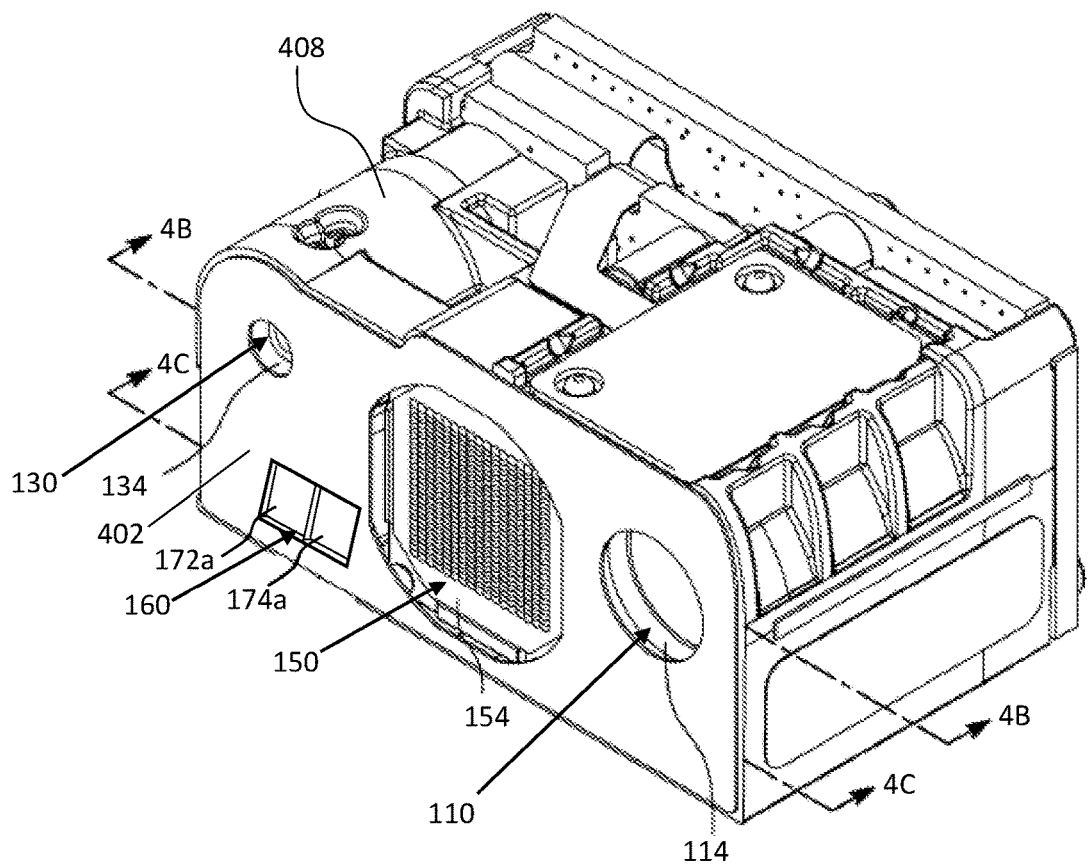
FIG. 4A is a perspective view of an example embodiment of the imaging system embodiments as a scan engine in accordance with embodiments of the present disclosure.
Figure 4A:
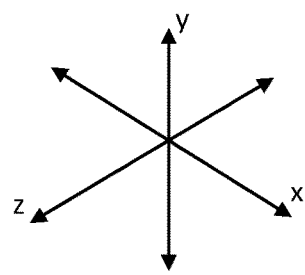
Figure 4B:
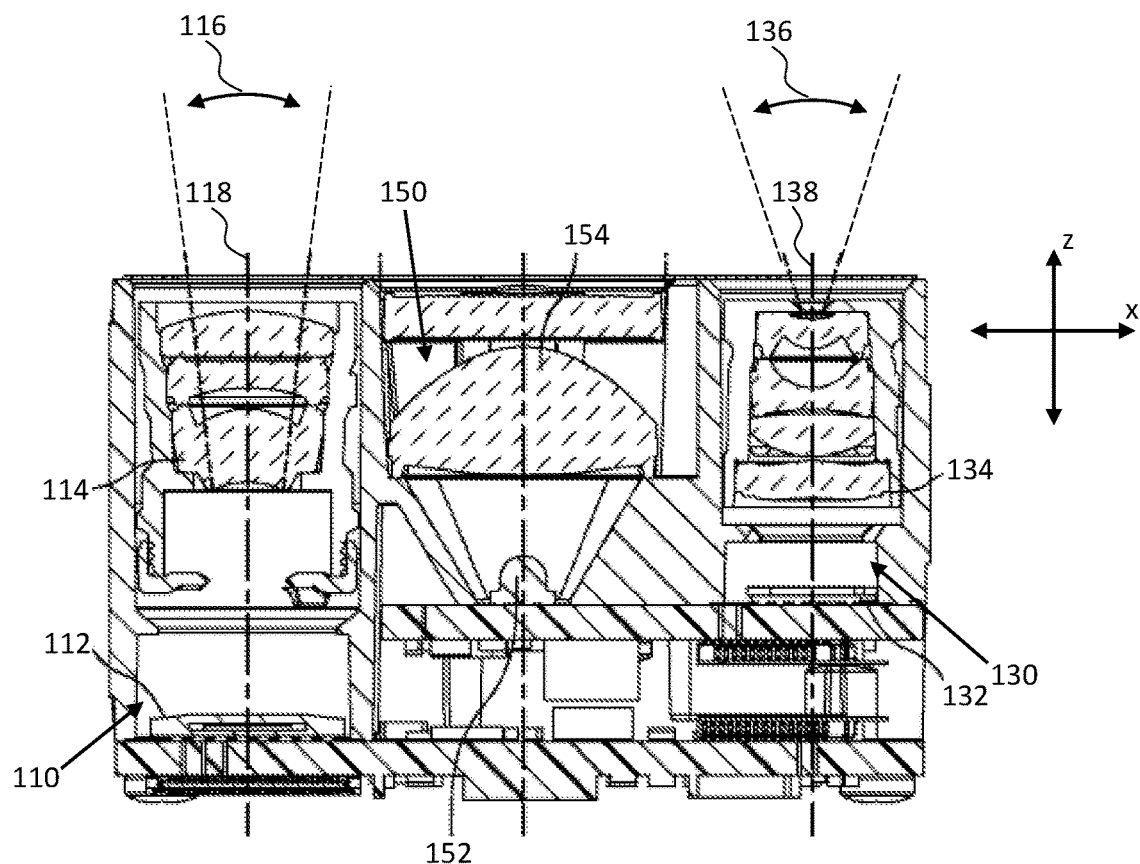
FIG. 4B is a cross-sectional view taken on line 4B-4B of FIG. 4A.
Figure 4C:
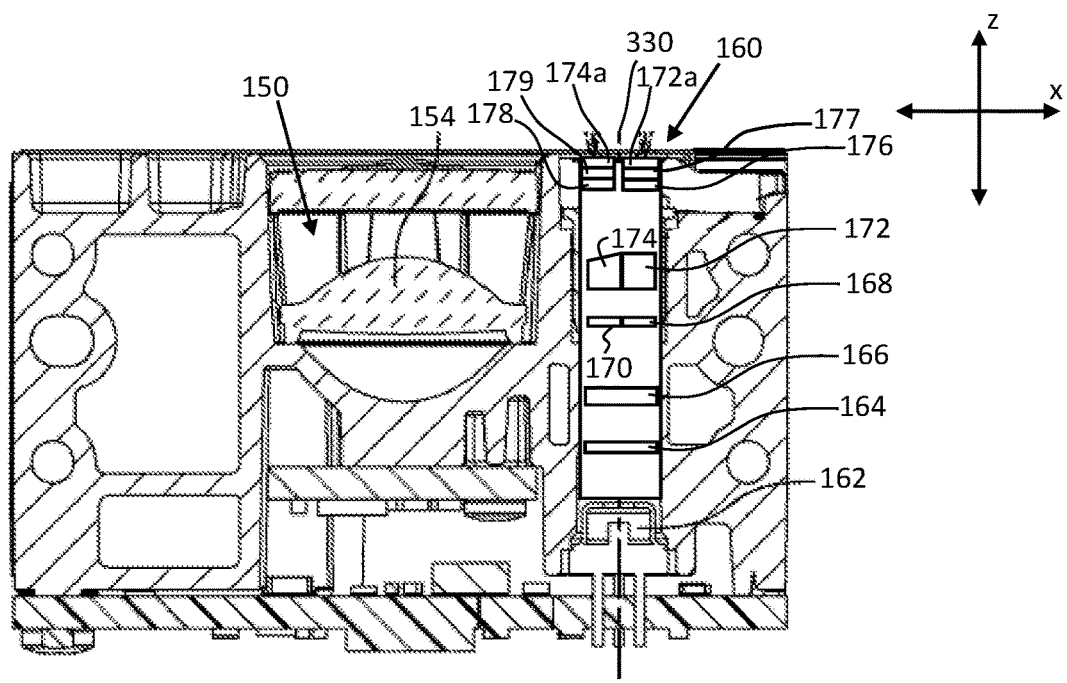
FIG. 4C is a cross-sectional view taken on line 4C-4C of FIG. 4A.

FIGS. 4A-C illustrate a portion of an embodiment of the imaging system 100 of the present disclosure embodied as a scan engine that may be incorporated into an indicia reading system and, for example, contained or incorporated within the housing 108. As shown in FIGS. 4A-C, a housing 408 can house the imaging assembly 110, the imaging assembly 130, the illumination assembly, and the aiming assembly 160. Openings can be formed in a face 402 of the housing 408 to allow light to emitted from the illumination assembly 150 and the aiming assembly 160 and to allow light to be received by the imaging assemblies 110 and 130. For example, opening can be formed such that portions of the first lens assembly 114, the second lens assembly 134, the illumination lens 154, and pattern generating elements 177 and 179 are visible from outside of the housing 408. As shown in FIGS. 4A-C, an example arrangement of the imaging assembly 110, the imaging assembly 130, the illumination assembly, and the aiming assembly 160 can position the illumination assembly 150 and aiming assembly 160 between the imaging assemblies 110 and 130 along the x-axis (e.g., across a width of the housing 408), where the aiming assembly 160 is further positioned between the imaging assembly 130 and the illumination assembly 150 along the x-axis (e.g., across a width of the housing 408). The aiming assembly 160 can further be positioned to be offset from the imaging assemblies 110 and 130 along a y-axis (e.g., along a height of the housing 408).

Figure 5:
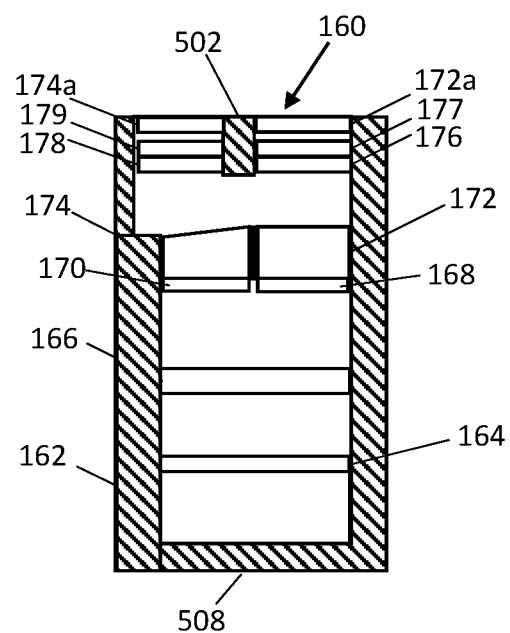
FIG. 5 is a schematic diagram of an example aiming assembly in a housing in accordance with embodiments of the present disclosure.

As shown in FIG. 5, an embodiment of the aiming assembly 160 can be included in a housing 508 as a stand-alone module or subassembly. Openings can be formed in a face 502 of the housing 508 to allow the patterned beams of light to be emitted from the aiming assembly 160 and the housing 508. The housing 508 can be incorporated into the housings 408 and/or 108 as a subassembly or add-on to be used in an embodiment of the imaging system 100.

Figure 6:
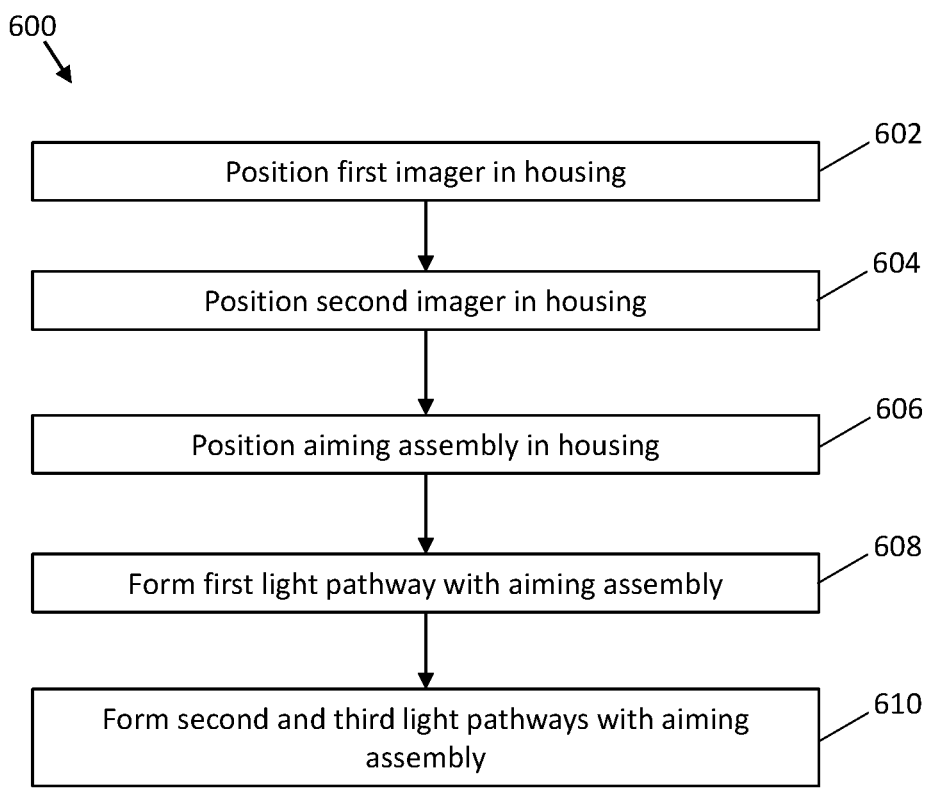
FIG. 6 is a flowchart illustrating a process in accordance with the embodiments of the present disclosure.

FIG. 6 is a flowchart illustrating a process 600 in accordance with the embodiments of the present disclosure. At operation 602, a first imager (e.g., imager 112) is positioned in a housing (e.g., housing 108 or 408). The first imager has a first field-of-view (e.g., field-of-view 116) extending along a first imaging axis (e.g., imaging axis 118). At operation 604, a second imager (e.g., imager 132) is positioned in the housing. The second imager has a second field-of-view (e.g., field-of-view 136 extending along a second imaging axis (e.g., imaging axis 138). The second imaging axis is offset from the first imaging axis. At operation 606, an aiming assembly (e.g., aiming assembly 160) is positioned in the housing. The aiming assembly is configured to selectively output light having at least one of a first pattern or a second pattern. The light having the first pattern is configured to intersect the first imaging axis and the light having the second pattern is configured to intersect the second imaging axis. At operation 608, a first light pathway (e.g., light pathway 320) is formed with the aiming assembly. The first light pathway is configured to be common to the light for the first pattern and the second pattern. At operation 610, second and third light pathways (e.g., light pathways 322 and 324) are formed with the aiming assembly, where the second and third light pathways are separate and distinct from each other. The light is configured to travel from the first light pathway along the second light pathway to selectively output the first pattern and configured to travel from the first light pathway along the third light pathway to selectively output the second pattern.

Figure 7:
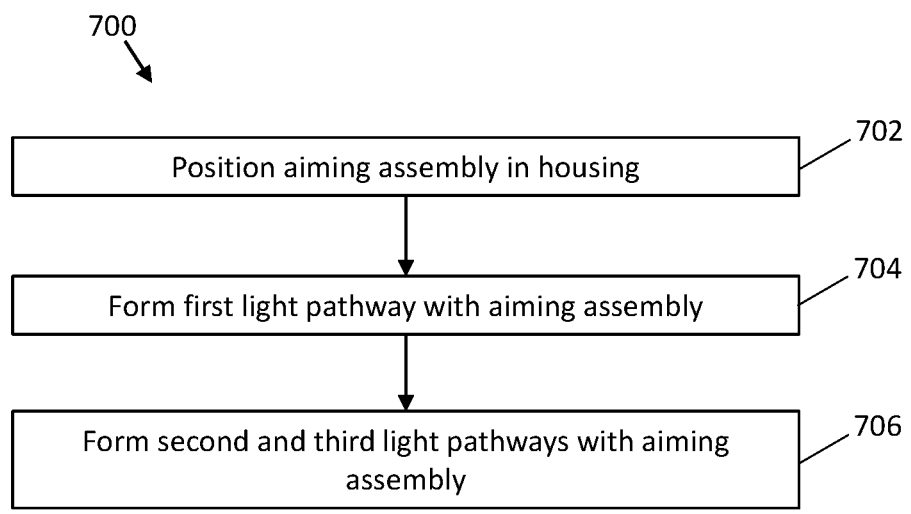
FIG. 7 is a flowchart illustrating another process in accordance with the embodiments of the present disclosure.

FIG. 7 is a flowchart illustrating a process 700 in accordance with the embodiments of the present disclosure. At operation 702, an aiming assembly (e.g., aiming assembly 160) is positioned in a housing (e.g., housing 108, 408, or 508). The aiming assembly is configured to selectively output light having at least one of a first pattern or a second pattern. The light having the first pattern is configured to intersect the first imaging axis and the light having the second pattern is configured to intersect the second imaging axis. At operation 704, a first light pathway (e.g., light pathway 320) is formed with the aiming assembly. The first light pathway is configured to be common to the light for the first pattern and the second pattern. At operation 706, second and third light pathways (e.g., light pathways 322 and 324) are formed with the aiming assembly, where the second and third light pathways are separate and distinct from each other. The light is configured to travel from the first light pathway along the second light pathway to selectively output the first pattern and configured to travel from the first light pathway along the third light pathway to selectively output the second pattern.

Figure 8:
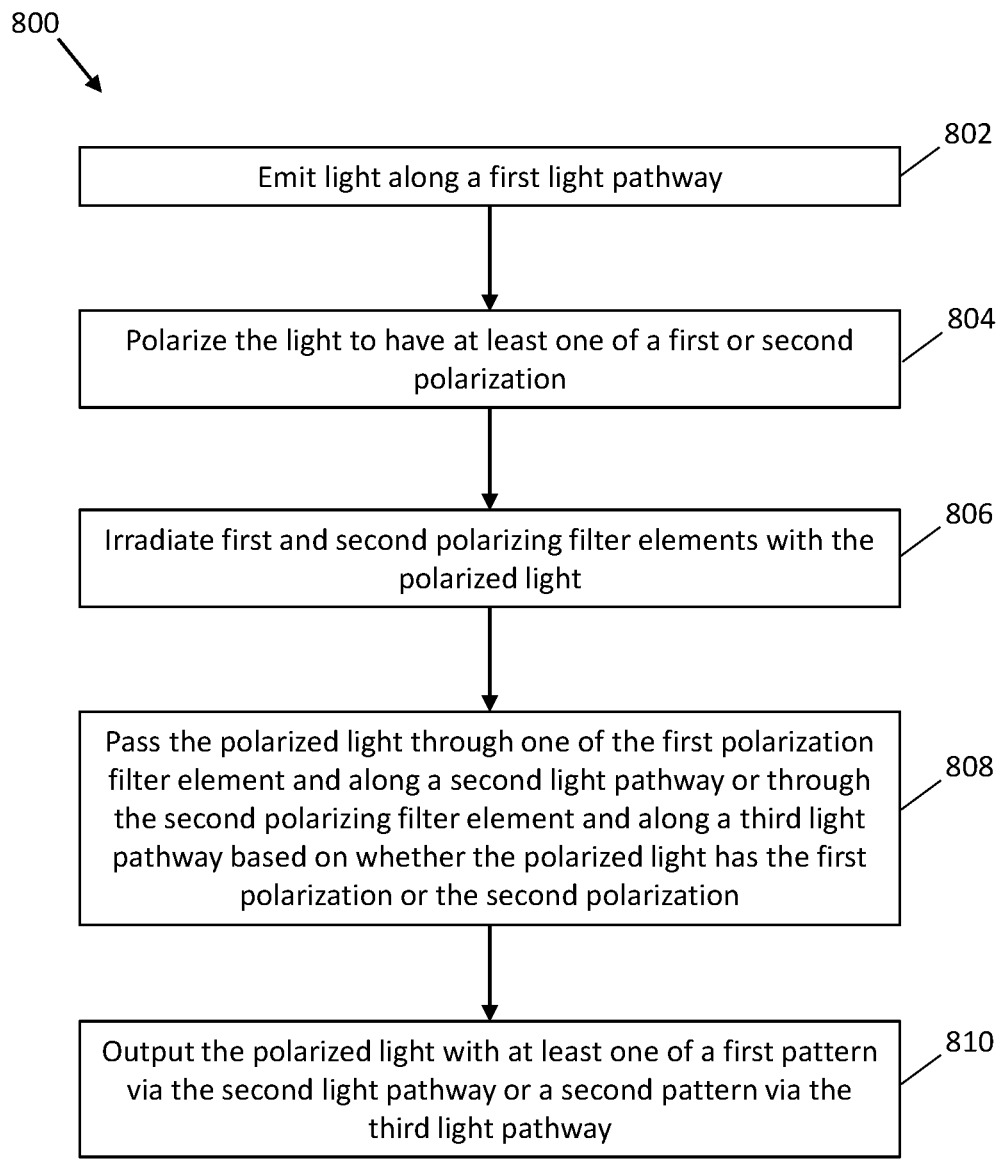
FIG. 8 is a flowchart illustrating another process in accordance with the embodiments of the present disclosure.

FIG. 8 is a flowchart illustrating an example process 800 in accordance with embodiments of the present disclosure. At operation 802, light is emitted by a light source (e.g., light source 162) along a first light pathway (e.g., light pathway 320). At operation 804, the light is polarized by an electro-optical polarizing device to generate polarized light having at least one of a first polarization or a second polarization. At operation 606, a first polarizing filter element and a second polarizing filter element are irradiated with the polarized light. The first polarizing filter element is configured to allow polarized light to pass through when the polarized light has the first polarization and to block polarized light from passing through when the polarized light has the second polarization. The second polarizing filter element is configured to allow polarized light to pass through when the polarized light has the second polarization and to block polarized light from passing through when the polarized light has the first polarization. At operation 608, the polarized light is passed through one of the first polarization filter element and along a second light pathway or is passed through the second polarizing filter element and along a third light pathway based on whether the polarized light has the first polarization or the second polarization. At 610, the polarized light is output with at least one of a first pattern via the second light pathway or a second pattern via the third light pathway. The polarized light output with the first pattern intersects a first imaging axis of a first imager and the polarized light output with the second pattern intersects a second imaging axis of a second imager, where the second imaging axis is offset from the first imaging axis.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging system comprising:
   a first imager having a first field-of-view extending along a first imaging axis;
   a second imager having a second field-of-view extending along a second imaging axis, the second imaging axis being offset from the first imaging axis; and
   an aiming assembly configured to selectively output light having at least one of a first pattern or a second pattern, the light having the first pattern intersects the first imaging axis and the light having the second pattern intersects the second imaging axis,
   the aiming assembly defining a first light pathway that is common to the light for the first pattern and the second pattern and defining second and third light pathways that are separate and distinct from each other, the light travels from the first light pathway along the second light pathway to selectively output the first pattern and travels from the first light pathway along the third light pathway to selectively output the second pattern.

2. The imaging system of claim 1, wherein the first light pathway of the aiming assembly comprises:
   a light source configured to emit light along the first light pathway; and
   an electro-optical polarizing device disposed along the first light pathway, the electro-optical polarizing device polarizes the light to have a first polarization or a second polarization in response to an electrical signal.

3. The imaging system of claim 1, wherein the aiming assembly comprises:
   a first polarizing filter element configured to allow the light having the first polarization to pass through; and
   a second polarizing filter element configured to allow the light having the second polarization to pass through.

4. The imaging system of claim 3, wherein the first polarizing filter element defines a first transition from the first light pathway to the second light pathway and the second polarizing filter element defines a second transition from the first light pathway to the third light pathway.

5. The imaging system of claim 4, wherein the second light pathway comprises:
   the first polarizing filter element; and
   a refractive prism.

6. The imaging system of claim 4, wherein the third light pathway comprises:
   the second polarizing filter element;
   a refractive prism; and a pattern generating element.

7. The imaging system of claim 6, wherein an output surface of the refractive prism is disposed at an angle relative to an orthogonal plane that is orthogonal to a direction the light travels through the first light pathway.

8. The imaging system of claim 1, wherein the light output from the aiming assembly with the first pattern and the light output from the aiming assembly with the second pattern diverge from each other.

9. The imaging system of claim 1, wherein the first light pathway has a first axis and the first light pathway splits into the second and third light pathways, where the second light pathway has a second axis and the third light pathway has a third axis, the second and third axes being offset from each other and from the first center axis.

10. The imaging system of claim 9, wherein the second axis is offset to a first side of the first axis and the third axis is on a second side of the first axis, the second side being opposite the first side.

11. A method comprising:
positioning a first imager in a housing, the first imager having a first field-of-view extending along a first imaging axis;
positioning a second imager in the housing, the second imager having a second field-of-view extending along a second imaging axis, the second imaging axis being offset from the first imaging axis;
positioning an aiming assembly in the housing, the aiming assembly configured to selectively output light having at least one of a first pattern or a second pattern, the light having the first pattern configured to intersect the first imaging axis and the light having the second pattern configured to intersect the second imaging axis,
forming a first light pathway with the aiming assembly, the first light pathway configured to be common to the light for the first pattern and the second pattern; and
forming second and third light pathways that are separate and distinct from each other, the light configured to travel from the first light pathway along the second light pathway to selectively output the first pattern and configured to travel from the first light pathway along the third light pathway to selectively output the second pattern.

12. The method of claim 11, further comprising:
positioning a light source in the first light pathway of the aiming assembly, the light source configured to emit light along the first light pathway; and
positioning an electro-optical polarizing device in the first light pathway, the electro-optical polarizing device configured to polarize the light to have a first polarization or a second polarization in response to an electrical signal.

13. The method of claim 11, further comprising:
positioning a first polarizing filter element in the aiming assembly, the first polarizing filter element configured to allow the light having the first polarization to pass through; and
positioning a second polarizing filter element in the aiming assembly, the second polarization filter element configured to allow the light having the second polarization to pass through.

14. The method of claim 13, wherein the first polarizing filter element defines a first transition from the first light pathway to the second light pathway and the second polarizing filter element defines a second transition from the first light pathway to the third light pathway.

15. The method of claim 14, further comprising:
positioning the first polarizing filter element and a refractive prism in the second light pathway.

16. The method of claim 14, further comprising:
positioning the second polarizing filter element, a refractive prism, and a pattern generating element in the third light pathway.

17. The method of claim 16, wherein an output surface of the refractive prism is disposed at an angle relative to an orthogonal plane that is orthogonal to a direction the light is configured to travel through the first light pathway.

18. The method of claim 11, wherein forming the second and third light pathways comprises:
forming the first and second light pathways to configure output from the aiming assembly so that the light with the first pattern and the light with the second pattern diverge from each other.

19. The method of claim 11, wherein the first light pathway has a first axis and the first light pathway splits into the second and third light pathways, where the second light pathway has a second axis and the third light pathway has a third axis, the second and third axes being offset from each other and from the first center axis.

20. The method of claim 19, wherein the second axis is offset to a first side of the first axis and the third axis is on a second side of the first axis, the second side being opposite the first side.

21. An imaging system comprising:
a first imager having a first field-of-view extending along a first imaging axis;
a second imager having a second field-of-view extending along a second imaging axis, the second imaging axis being offset from the first imaging axis;
a light source that emits light;
an electro-optical polarizing device configured to polarize the light to have a first polarization or a second polarization in response to an electrical signal;
a first polarizing filter element configured to allow light to pass through the first polarizing filter element when the light has the first polarization and to block the light from passing through the first polarizing filter element when the light has the second polarization;
a second polarizing filter element configured to allow the light to pass through the second polarizing filter element when the light has the second polarization and to block the light from passing through the second polarizing filter element when the light has the first polarization; and
a pattern generating device disposed relative to the second polarizing filter element, the pattern generating device generating patterned light when the light passes through the second polarizing filter element,
wherein the light intersects the first imaging axis when the light passes through the first polarizing filter element and the intersects the second imaging axis when the light passes through the second polarizing filter element.

22. A method comprising:
emitting, via a light source, light along a first light pathway;
polarizing, via an electro-optical polarizing device, the light to generate polarized light having at least one of a first polarization or a second polarization;
irradiating a first polarizing filter element and a second polarizing filter element with the polarized light, the first polarizing filter element configured to allow polarized light to pass through when the polarized light has the first polarization and to block polarized light from passing through when the polarized light has the second polarization, the second polarizing filter element configured to allow polarized light to pass through when the polarized light has the second polarization and to block polarized light from passing through when the polarized light has the first polarization;

passing the polarized light through one of the first polarization filter element and along a second light pathway or the second polarizing filter element and along a third light pathway based on whether the polarized light has the first polarization or the second polarization;

outputting the polarized light with at least one of a first pattern via the second light pathway or a second pattern via the third light pathway, the polarized light output with the first pattern intersects a first imaging axis of a first imager and the polarized light output with the second pattern intersects a second imaging axis of a second imager, the second imaging axis being offset from the first imaging axis.

* * * * *